United States Patent [19]
Bond

[11] Patent Number: 4,715,242
[45] Date of Patent: Dec. 29, 1987

[54] APPARATUS FOR TURNING A WORKPIECE OVER ALONG A TWISTING PATH OF MOTION

[76] Inventor: Irvin D. Bond, 5970 Wall St., Sterling Heights, Mich. 48077

[21] Appl. No.: 829,165

[22] Filed: Feb. 14, 1986

Related U.S. Application Data

[63] Continuation-in-part of Ser. No. 714,844, Mar. 22, 1985, Pat. No. 4,676,113.

[51] Int. Cl.$^4$ ............................................. F16H 21/44
[52] U.S. Cl. ...................................................... 74/102
[58] Field of Search .......................... 74/102, 104, 107; 164/409

[56] References Cited

U.S. PATENT DOCUMENTS 2,775,800  1/1957  Ellms .................................... 164/409
4,593,573  6/1986  Bond .................................. 74/107 X

FOREIGN PATENT DOCUMENTS 701925  1/1965  Canada ................................ 164/409

Primary Examiner—Philip C. Kannan
Attorney, Agent, or Firm—Charles W. Chandler

[57]    ABSTRACT

Apparatus for turning over a workpiece, such as a large metal stamping, in a motion in which it is swung about the axis of a turn-over shaft while being rotated about a second axis. The workpiece is mounted on a support connected to the output member of a right angle gear box. Both the support and the gear box are carried on the turn-over shaft. The input end of the gear box carries a sheave connected by a belt to a second sheave mounted on the base supporting the turn-over shaft. As the workpiece and the gear box are swung about the turn-over shaft towrad an upside down position, the workpiece is turned in a secondary motion depending upon the ratio of the diameters of the two sheaves.

13 Claims, 8 Drawing Figures

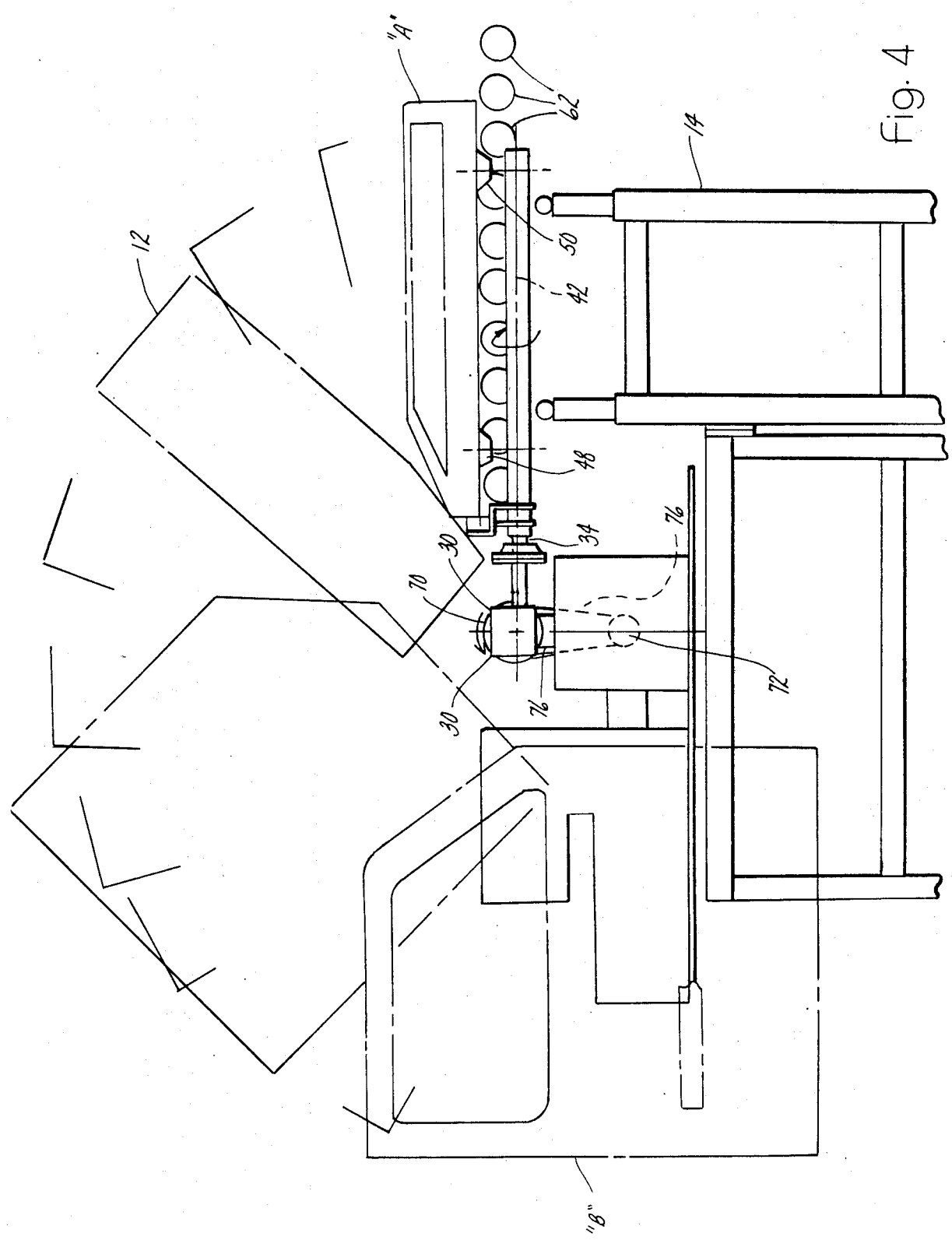

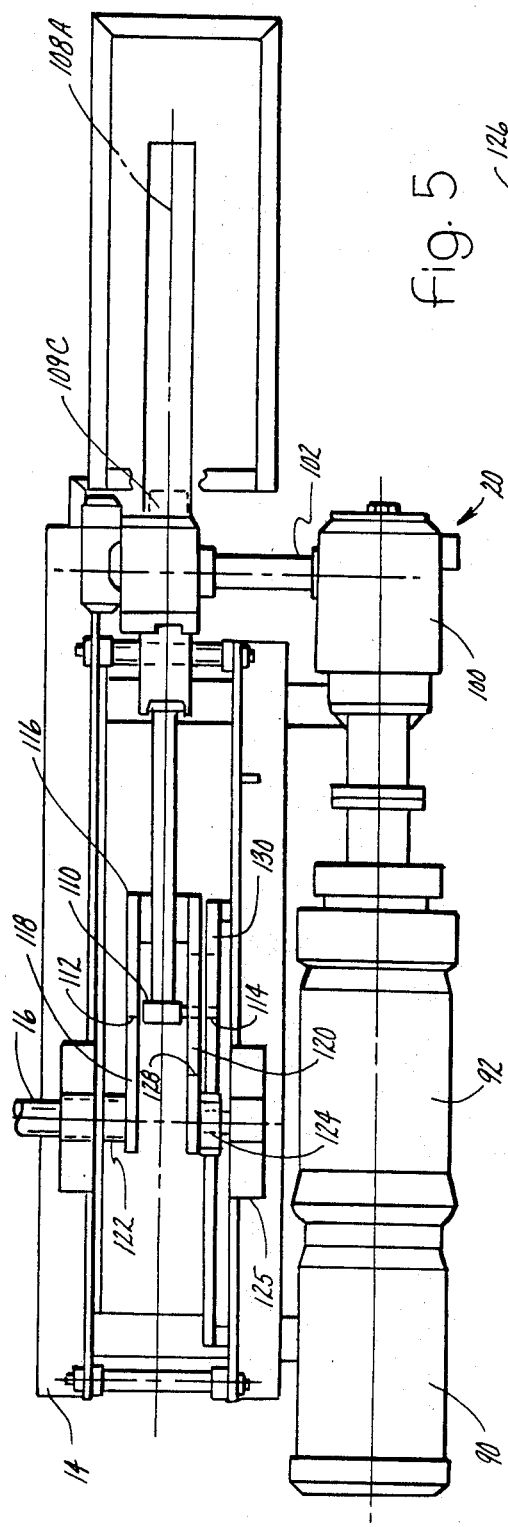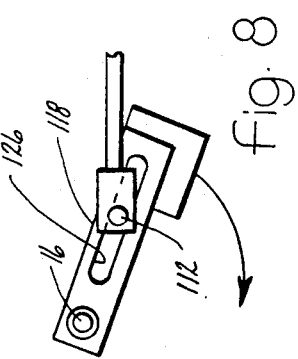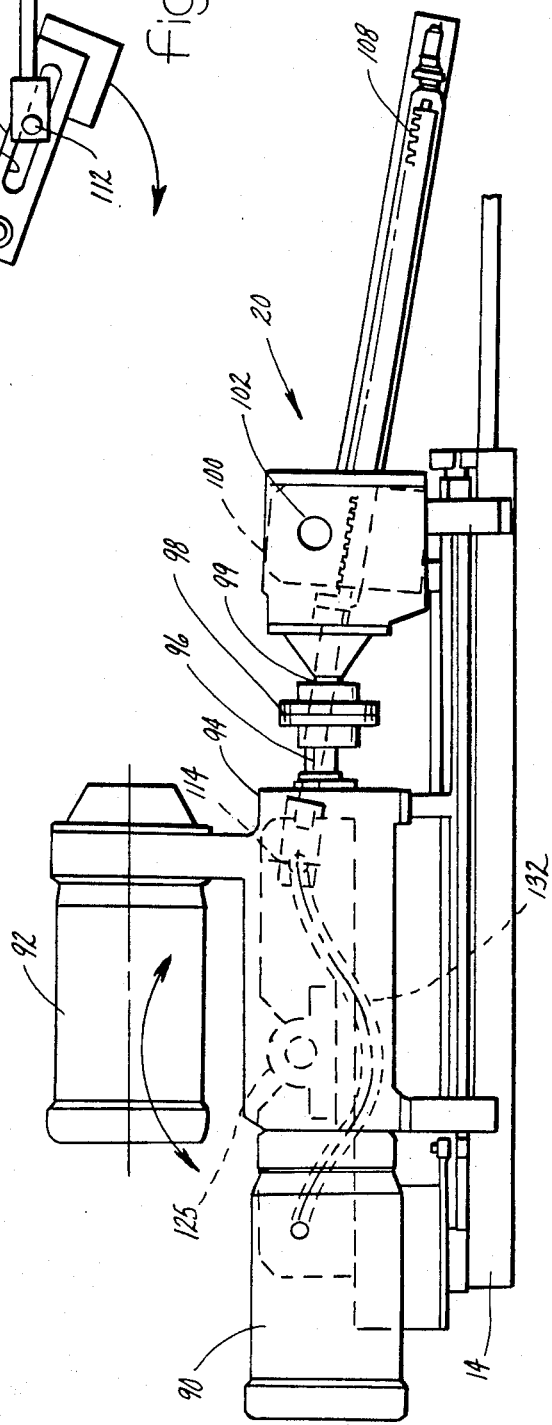

APPARATUS FOR TURNING A WORKPIECE OVER ALONG A TWISTING PATH OF MOTION

CROSS-REFERENCE TO RELATED APPLICATION

This application is a continuation-in-part of my patent application Ser. No. 714,844, filed Mar. 22, 1985 for Motion Transmitting Means now U.S. Pat. No. 4,676,113.

BACKGROUND OF THE INVENTION

This invention is related to apparatus for turning over a workpiece, such as a metal stamping, along a twisting path of motion, and more particularly to such an apparatus comprising a workpiece support mounted on a turn-over shaft so as to be swung with the shaft about its axis of rotation, and so connected to a gear box and sheave arrangement as to be rotated about a second axis generally at right angles to that of the turn-over shaft. The turn-over shaft is rotated in a variable, controlled rate of motion.

There are many industrial applications where a workpiece is turned over between a pair of work stations. The stamping is usually manually repositioned if the attitude of the stamping is changed as it is being turned over.

SUMMARY OF THE INVENTION

The broad purpose of the present invention is to provide means for moving a relatively large workpiece, such as a stamping, along a twisting path of motion as it is being turned over from a first position toward a second position.

In the preferred embodiment of the invention, which will be described in greater detail, the stamping is connected to a workpiece support by vacuum cup pick-up devices. The workpiece support is mounted on the output end of a right angle gear box. The gear box base is mounted on a turn-over shaft that is rotated through an angle, such as 180° at a variable rate of rotation, to turn the workpiece over. A sheave mounted on the input end of the gear box is connected by a belt to another sheave mounted on the turn-over shaft base in such a manner that as the gear box and workpiece are rotated with the turn-over shaft, the workpiece is also rotated about the axis of rotation of the gear box shaft.

The user can define the amount of twisting motion achieved in relationship to the rotation of the turn-over shaft by appropriately choosing the diameter ratio of the two sheaves.

The turn-over shaft can be driven by a variety of power means. In the preferred embodiment, a rack and pinion are connected to a pair of high speed electric motors. One motor moves the rack in one direction, and the other motor moves the rack in the opposite direction. The rack is connected by a cam arrangement to the turn-over shaft to rotate it in a variable, controlled rate of rotation. Thus, the workpiece is turned over in a relatively slow rate of motion at the beginning and end of its cycle, and in a higher rate of motion during its intermediate positions.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which:

FIG. 4 is a partially schematic view, similar to FIG. 2, but illustrating a stamping being moved through several intermediate positions;

FIG. 5 is a plan view of the drive means;

FIG. 6 is an elevational view of the drive means;

FIG. 8 is a view showing the drive yoke.

DESCRIPTION OF THE PREFERRED EMBODIMENT

Figure 1:
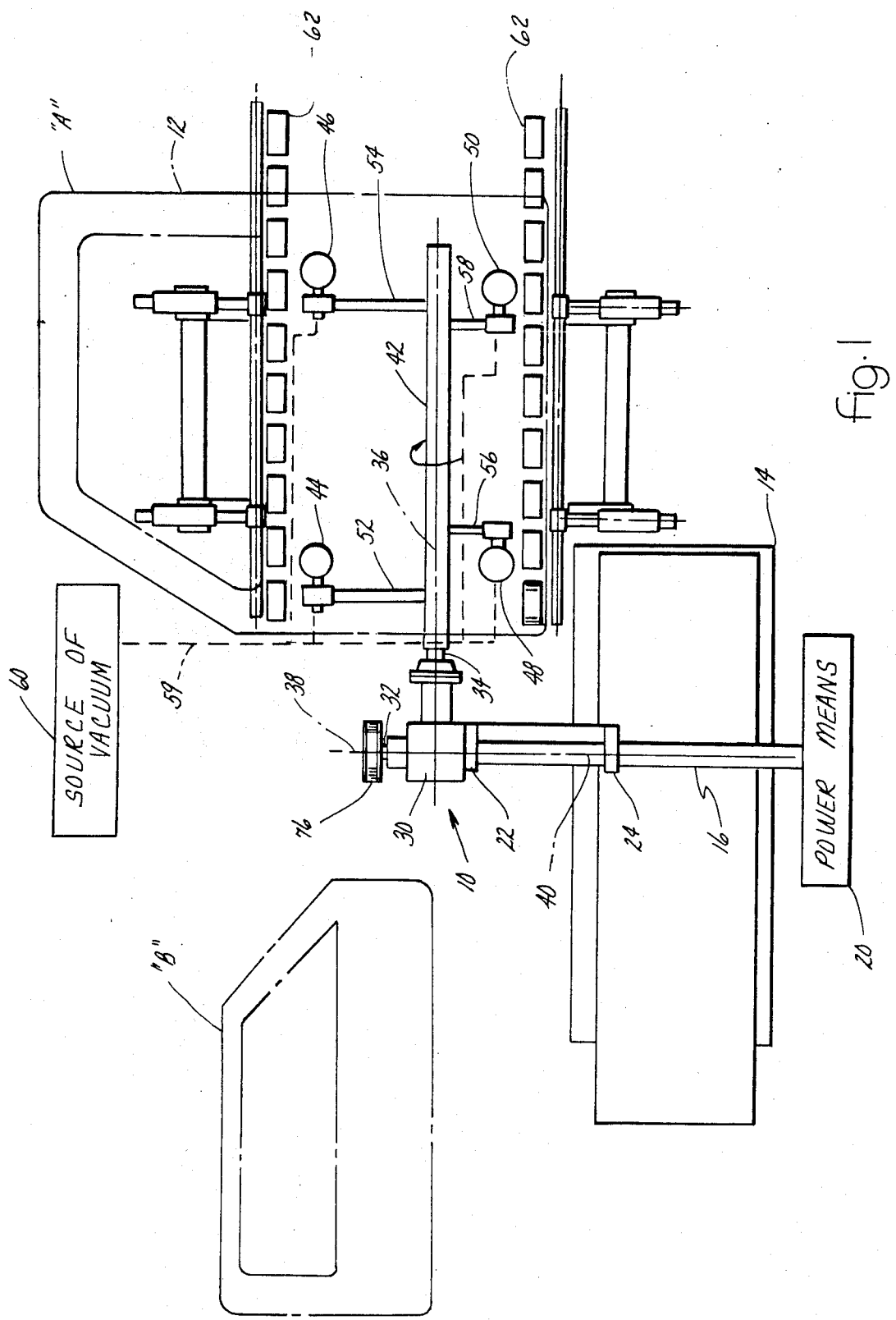
FIG. 1 is a partially schematic, plan view of the turn-over apparatus illustrating the preferred embodiment of the invention.
Figure 2:
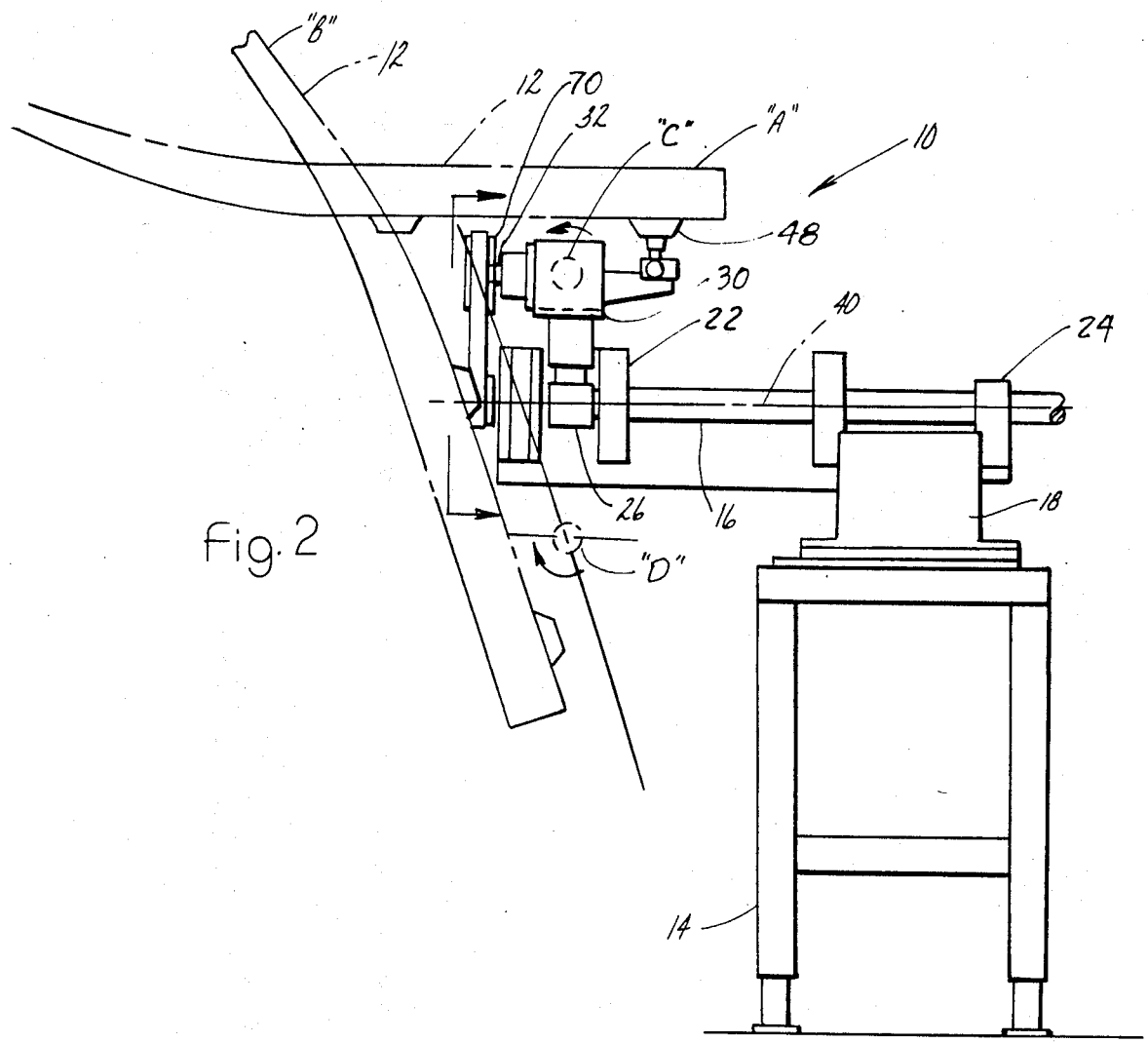
FIG. 2 is an elevational view of the turn-over apparatus, as seen from the bottom side of FIG. 1.

Referring to the drawings, FIGS. 1, 2 and 4 illustrate a turn-over apparatus, generally indicated at 10, for moving sheet metal workpiece 12 from a generally horizontal position at "A", toward a slanting position at "B".

Apparatus 10 includes base means 14. Horizontal turn-over shaft 16 is mounted by support 18 on the base means.

Power means, illustrated at 20, are adapted to rotate turn-over shaft 16 in one direction to move the workpiece from position "A" to position "B", and then in the opposite direction to return the workpiece support means toward their initial position.

Pillow blocks 22 and 24 support the turn-over shaft on the base means. Bracket 26 is fastened to the end of the turn-over shaft. Right angle gear box 30 is mounted on the bracket so as to move in an arc as the turn-over shaft is being rotated. Referring to FIG. 1, the gear box has shaft 32 and pinion 34 connected internally in the conventional manner such that as pinion 34 is rotated about axis 36, shaft 32 is rotated about axis 38, located at right angles to axis 36, and disposed parallel to axis of rotation 40 of the turn-over shaft.

An elongated work-supporting member 42 is connected in a cantilever manner to gear box pinion 34. Four vacuum-operated pick-up devices 44, 46, 48 and 50 are connected by brackets 52, 54, 56 and 58, respectively to member 42. Each of the vacuum pick-up devices is connected by flexible conduit means 59 to a controlled source of vacuum 60 in the usual manner for picking up workpiece 12.

Conveyor means 62 delivers workpiece 12 to the vacuum pick-up devices.

As the turn-over shaft is rotated in the counterclockwise direction, as viewed in FIGS. 2 and 4, workpiece 12 is turned over from position "A" through an arc of about 200° to position "B". Member 42 is rotated from an upper position "C" to a lower position "D".

Figure 7:
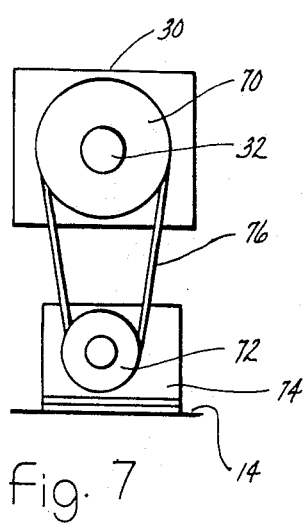
FIG. 7 is a view as generally seen along lines 7—7 of FIG. 2.

Referring to FIGS. 2 and 7, a relatively large sheave 70 is mounted on gear box shaft 32. A smaller, fixed, second sheave 72 is mounted by bracket 74 on base means 14. Belt 76 is mounted on the two sheaves. The arrangement is such that as gear box 30 is rotated with the workpiece about turn-over axis 40, the belt causes sheave 70 to rotate gear box shaft 32, which in turn, rotates pinion 34 and the workpiece about axis 36. Thus the workpiece moves through a twisting motion as it is moved from its initial position "A" toward its final position "B". The amount of twist is a function of the ratio of the diameters of sheave 70 to sheave 72. A larger sheave will produce a smaller rotation while a smaller sheave will produce a larger rotation. Workpiece 12 is moved to a position located against suitable support means, not shown, for a subsequent operation.

Figure 3:
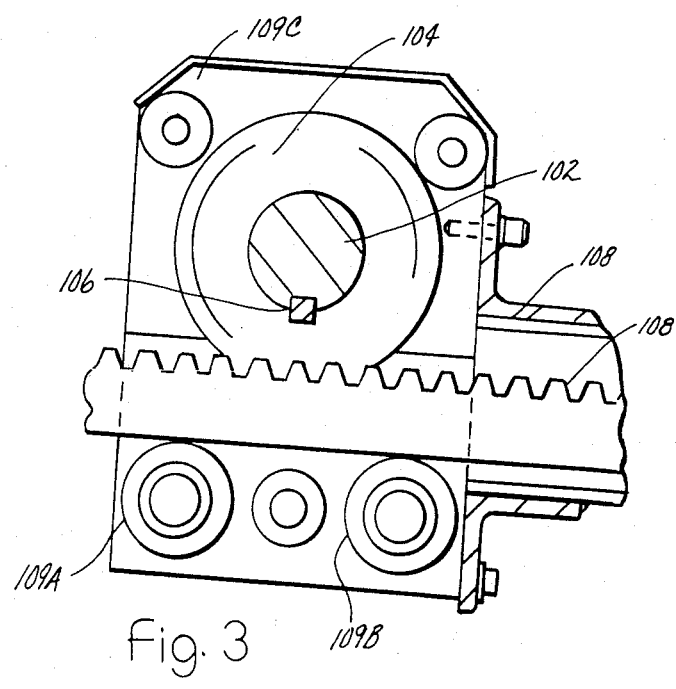
FIG. 3 is an enlarged view of the rack and pinion drive means.

Referring to FIGS. 3, 5 and 6, power 20 comprises a pair of electric motors 90 and 92 mounted on a common frame 94 which in turn is mounted on base means 14. One motor is adapted to rotate output shaft 96 in one direction while the other motor is adapted to rotate shaft 96 in the opposite direction. The motors are both connected to an internally mounted clutch means so as to rotate output member 96 in a direction depending upon which motor is drivingly connected to member 96. Output member 96 is connected by coupling 98 to pinion 99 of right angle gear box 100.

As best viewed in FIG. 5, gear box 100 has output shaft 102. Referring to FIG. 3, pinion gear 104 is connected by key 106 to shaft 102. Rack 108 is mounted in housing 108A and slideably mounted on roller means 109A and 109B which are supported by housing 109C. The rack is in mesh with pinion gear 104. The rack is reciprocated by gear 104 in opposite directions depending upon the direction of rotation of shaft 102.

Referring to FIG. 5, rack 108 carries clevis 110, which in turn supports co-axial cam rollers 112 and 114. Yoke 116 has a pair of sides 118 and 120. Yoke side 118 has collar 122 connected to turn-over shaft 16. Yoke side 120 has short pivot means 124 pivotally mounted on pillow block 125, as can be seen in FIG. 8. Yoke side 118 has slot 126 and yoke side 120 has slot 128. Cam roller 112 rides in slot 126 while cam roller 114 rides in slot 128 in such a manner that as the rack is moved in one direction, the yoke is swung in one direction to rotate turn-over shaft 16, and as the rack is moved in the opposite direction, the yoke and turn-over shaft are rotated in the opposite direction.

As best viewed in FIG. 6, cam plate 130 has a sinuous cam slot 132 and is mounted adjacent yoke 116. Cam roller 114 is also disposed in cam slot 132. The arrangement is such that as the rack is driven by the electric motors, the rack rotates turn-over shaft 16 while cam slot 132 defines the variable rate of motion of the turn-over shaft. Thus, when the rack is moved at a uniform rate of motion, turn-over shaft 16 is moved in a variable rate of motion such that the workpiece is initially moved in a slow motion, then in a more rapid motion and then in a relatively slow motion, defined by the shape of cam slot 132.

It is to be understood that I have described an improved apparatus for turning over a workpiece in a twisting path of motion at a variable, controlled rate of motion as defined by cam 132.

Having described my invention, I claim:

1. Apparatus for turning a workpiece over along a twisting path of motion, comprising:
   a base;
   a turnover shaft mounted on the base, and power means for rotating the turnover shaft about a first axis of rotation between first and second rotated positions;
   workpiece support means mounted on the turn-over shaft so as to be rotated therewith about said first axis of rotation, the workpiece support means being so mounted on the turnover shaft as to be rotatable with respect to the turnover shaft about a second axis that is non-parallel with respect to said first axis of rotation; and
   first means connecting the turnover shaft to the workpiece support means such that the workpiece support means is rotated about the second axis of rotation as the turnover shaft is being rotated about said first axis of rotation.

2. A combination as defined in claim 1, in which the first means includes a first sheave mounted on the workpiece support means and a second sheave mounted on the base, and motion transmitting belt means mounted on the first sheave and the second sheave so as to define the ratio of the rotation of the workpiece support means about the second axis with respect to the rotation of the turn-over shaft about the first axis.

3. A combination as defined in claim 1, in which the first means includes a gear box mounted on the turn-over shaft, the gear box having a rotatable member, and including means for connecting the workpiece support means to the rotatable member so as to be rotatable therewith.

4. A combination as defined in claim 1, in which the power means includes pinion gear means, electric motor means for rotating the pinion gear means, rack means connected to the pinion gear means so as to be reciprocated thereby, and means for connecting the rack means to the turn-over shaft to rotate it as the rack means is being reciprocated.

5. A combination as defined in claim 1, including cam means connected between the power means and the turn-over shaft to rotate same at a predetermined variable rate of motion.

6. A combination as defined in claim 1, in which the power means includes electrically energized motor means operative to rotate the turn-over shaft in a first direction and then in the opposite, second direction.

7. A combination as defined in claim 6, in which the motor means includes a first electrically energized motor means for rotating the turn-over shaft in a first direction, and a second electrically energized motor means for rotating the turn-over shaft in the opposite direction.

8. Apparatus for turning a workpiece over along a twisting path of motion, comprising:
   a base;
   a turn-over shaft mounted on the base;
   power means for rotating the turn-over shaft about a first axis of rotation between first and second rotated positions, the power means including pinion gear means, electric motor means for rotating the pinion gear means, rack means connected to the pinion gear means so as to be reciprocated thereby, and means for connecting the rack means to the turnover shaft to rotate it as the rack means is being reciprocated;
   workpiece support means mounted on the shaft so as to be rotated therewith about said first axis of rotation; and
   first means connecting the turnover shaft to the workpiece support means so as to be rotated with the turnover shaft about a second axis in such a manner that as the workpiece support means is rotated with the turnover shaft about said first axis, the workpiece support means is rotated about the second axis in a timed relationship with respect to the rotation of the turnover shaft about the first axis.

9. A combination as defined in claims 1 or 8, in which the second axis of rotation is generally at right angles with respect to the first axis of rotation.

10. A combination as defined in claims 1 or 8, in which the second axis of rotation is generally at right angles and spaced with respect to the first axis of rotation.

11. Apparatus for moving a workpiece along a twisting path of motion, comprising:
   a base;
   a shaft, and power means for reciprocally moving the shaft between first and second rotated positions about a first axis of rotation;
   a support mounted on the shaft so as to be rotated therewith;
   gear box means mounted on the support, the gear box means having a first rotatable member, and a second rotatable member so connected to the first rotatable member that as one of the rotatable members is being rotated, the other rotatable member is rotated about a second axis at right angles to the axis of rotation of the first rotatable member;
   means for mounting the workpiece on the support and connected to the second rotatable member such that as the workpiece is being rotated with the shaft about said first axis, the workpiece is simultaneously rotated about the second axis as the second rotatable member is being rotated;
   a first sheave having a first diameter mounted on the first rotatable member of the gear box means;
   a second sheave having a second diameter mounted on the base; and
   belt means mounted on the first sheave and the second sheave such that as the support is being rotated about the first axis of rotation, the workpiece is rotated about the second axis of rotation in a ratio of motion with respect to the rotation of the shaft depending upon the ratio of the diameters of the first sheave and the second sheave.

12. A combination as defined in claim 11, in which the power means is operative to rotate the shaft in a variable rate of rotation.

13. Apparatus for turning a workpiece over along a twisting path of motion, comprising:
   a base;
   an elongated turnover shaft having a longitudinal axis and being mounted on the base;
   power means for rotating the turnover shaft about the longitudinal axis thereof either in a first direction toward a first rotated position, or in the opposite direction toward a second rotated position;
   workpiece support means mounted on the turnover shaft so as to be rotated therewith about the longitudinal axis of the turnover shaft, the workpiece support means being rotatable about a second axis that is non-parallel with respect to the longitudinal axis of the turnover shaft; and
   first means connecting the turnover shaft to the workpiece support means such that as the turnover shaft is being rotated, the workpiece support means is simultaneously driven by the turnover shaft about the second axis of rotation.

* * * * *